Dec. 18, 1934.  J. O. KER ET AL  1,984,880
GRADING TAG FOR POULTRY AND FOOD PRODUCTS GENERALLY
Filed July 2, 1931  2 Sheets-Sheet 1
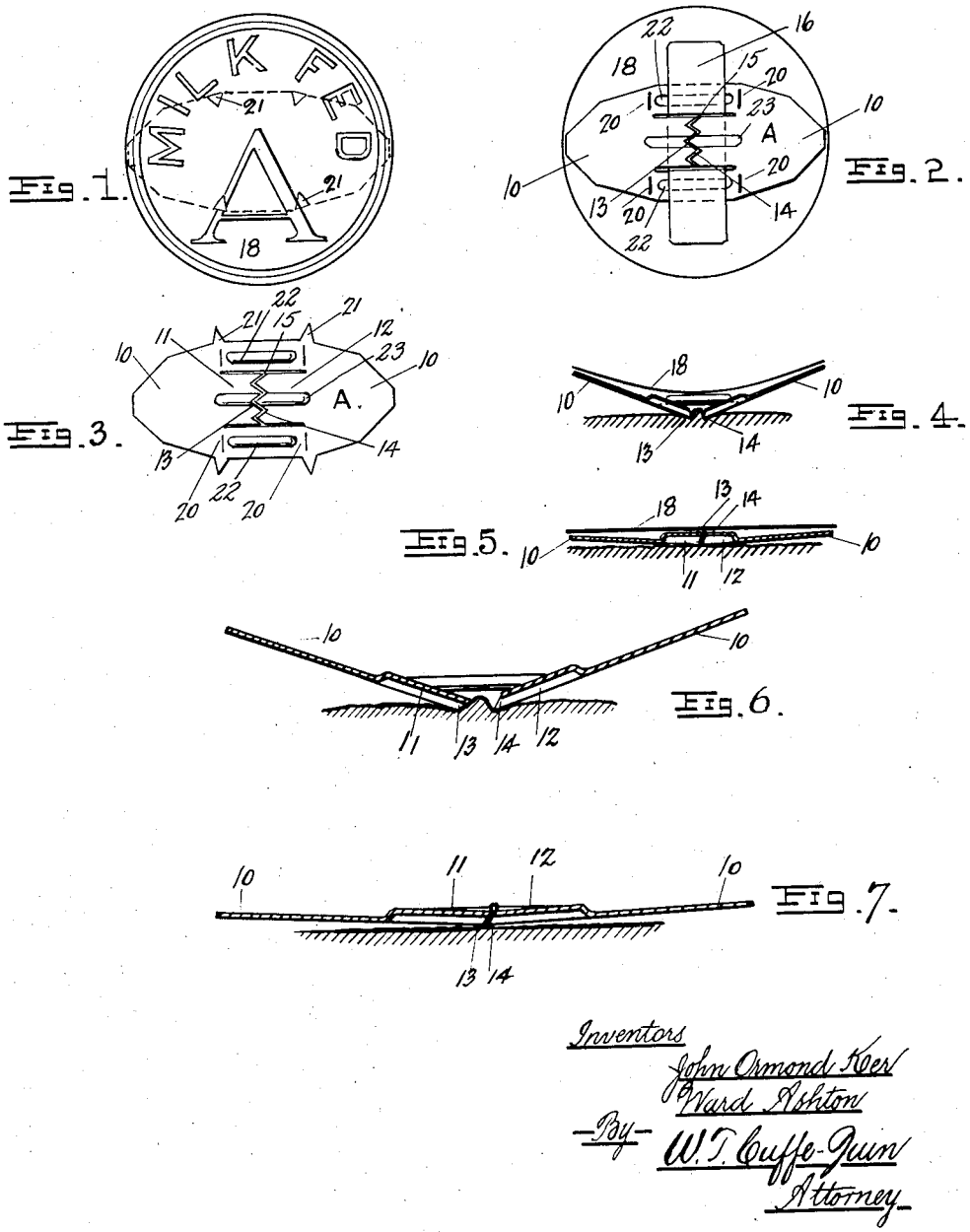

Dec. 18, 1934.  J. O. KER ET AL  1,984,880
GRADING TAG FOR POULTRY AND FOOD PRODUCTS GENERALLY
Filed July 2, 1931  2 Sheets-Sheet 2
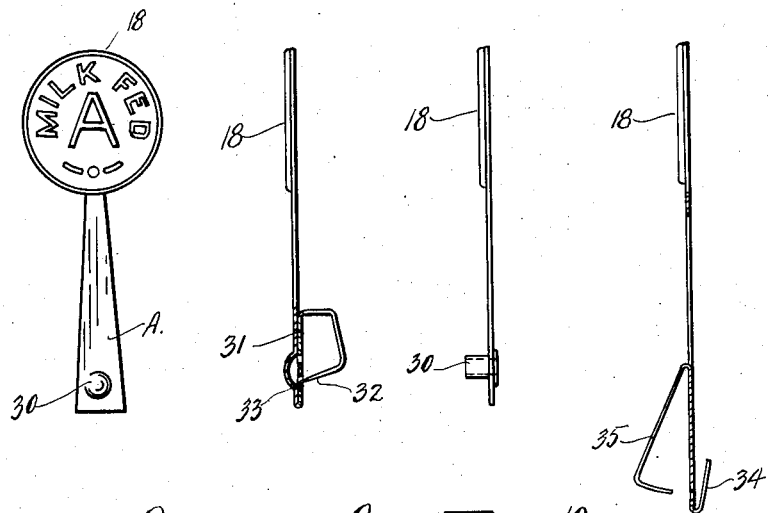
Fig. 8.  Fig. 9.  Fig. 10.
Fig. 11.
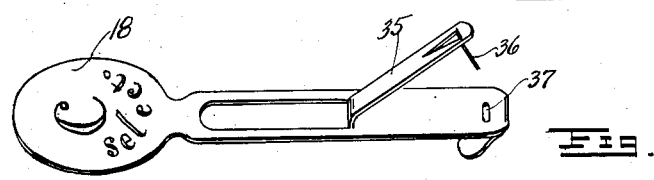
Fig. 12.
Fig. 13.
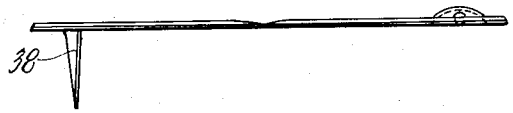
Fig. 14.
Inventors
John Ormond Ker
Ward Ashton
By W. T. Cuffe-Quin
Attorney Patented Dec. 18, 1934

1,984,880

UNITED STATES PATENT OFFICE 1,984,880

GRADING TAG FOR POULTRY AND FOOD PRODUCTS GENERALLY

John Ormond Ker and Ward Ashton, Ottawa, Ontario, Canada; said Ashton assignor to said Ker Application July 2, 1931, Serial No. 548,356

11 Claims. (Cl. 40—3)

The invention relates to grading and identification tags generally and more particularly to grade indicating tags for poultry, birds, food products, merchandise and the like.

One of the objects of the invention is to provide a light, durable and attractive tamperproof marker for indicating the different grades of poultry, birds, food products, merchandise and the like, adapted for quick and secure attachment on being brought into contact with the object to be marked and then pressed.

Another object is to provide a marker or grade indicator of this description than can be manufactured and placed on the market at very low cost, that can be readily handled with two fingers and which, when brought into contact with, for example the breast of a bird, will engage with the skin and on being pressed will be fixedly secured thereto by automatically gripping the skin. The marker being so constructed that it cannot be removed or tampered with without breaking and, therefore not available for use a second time.

A further object is to provide a marker of attractive appearance in which the indicia carrying portion only is visible when the marker is in position.

Yet another object is to provide a flexible marker with flexible indicia carrying means associated therewith, whereby the marker as a whole is first slightly curved ready for engagement with the object to be graded or marked and on being pressed to securely grip such object while conforming to the contour thereof, the indicia carrying means being alone visible.

We are aware that many attempts have been made to provide markers or grade indicating means that could be attached to the leg, wing or neck of a bird or in the form of a clamp to the body of a bird and so on, but these have been found from practical experience, quite unsatisfactory not only in respect of the cost, but also in that they did not work efficiently, being liable to become displaced and practically invisible, moreover it was possible to detach and use them again, thereby tending to deceive the public.

Our marker differs from others heretofore in use in that it is essentially adapted in grading poultry and the like to be placed on the breast of the bird where it will be readily visible. Furthermore, in attaching it the flesh of the bird is not necessarily penetrated or injured in any way, the loose skin being simply gripped while the only visible portion of the marker when attached, is the disc or shield carrying the identifying indicia.

The novel features of the marker consist of a flexible metallic strip intermediately formed with gripping tongues operable to open or gripping position by manually bending the strip, in combination with an indicia carrying disc of flexible material, whereby the marker is normally curved to open the gripping tongues for contact with the object to be graded or marked and then pressed to cause the tongues to grip the object while permitting the strip as a whole to straighten out and conform to the contour thereof with only the disc exposed to view.

The invention will be best understood by reference to the following description when taken in connection with the accompanying illustrations of a specific embodiment thereof while the scope of the invention will be more particularly pointed out in the claims.

Fig. 1 is a front view of the grade marker or tag as applied to a dressed bird.

Fig. 2 is a plan view of the back of the marker showing fastening of label or disc.

Fig. 3 is a detail plan view of the back of the marker with the indicia carrying means removed and showing the means for attaching the mark and means for retaining the indicia carrying means thereon.

Fig. 4 is a sectional detail of the tag showing the first operation of attaching same.

Fig. 5 is a sectional detail showing the complete operation of attaching the grader.

Fig. 6, enlarged section similar to 4, with label left off.

Fig. 7, enlarged section similar to 5, with label omitted.

Fig. 8 is a front view of the modified form.

Fig. 9 is a side view of a further modified form.

Fig. 10 is a side view of yet another modified form.

Fig. 11 is a side view of a further modified form.

Fig. 12 is a plan view of the modified form shown in Fig. 11.

Fig. 13 is a plan view of another modified form.

Fig. 14 is a side view of the modified form shown in Fig. 13.

Referring now more particularly to the drawings in which like numerals of reference indicate corresponding parts in each figure, A denotes a strip of flexible material preferably aluminium, which may be of any suitable length and is preferably tapered to any suitable extent at each end as at 10.

The dimensions of the strip in the example here shown coincide with an indicia carrying disc 18, hereinafter more fully referred to, so that when the marker is attached the disc will completely hide the strip leaving the disc only, with indicia thereon, visible. In other words, the means for attaching the disc is not seen and the disc shows up like a button on the breast of the graded bird.

Substantially midway of the strip are stamped out tongues 11 and 12, provided with extremities or tips 13 and 14, serrated as at 15, adopted when the strip A is curved to open, ready for engagement with the object to be marked on contact therewith, then on being pressed or straightened out preferably with the thumb and second finger of the operator, the tongues or, as they may also be called, gripping members 12 and 13, will automatically grip the loose flesh of the bird fixedly securing the marker thereon. The strip A may be further bent to conform to the contour of the object to which it is secured without loosening the grip of the tongue 12.

Co-operating with the portions 12 and 13, and secured to the strip by a band 16, or other suitable means on the back thereof passing between the tongues and the body of the strip is the disc 18 or label, of flexible material on which is marked, in the present example, the grade of a bird. To more effectively secure the disc on the strip, lugs 21, are provided, which can be readily bent over or clinched as shown in Fig. 1, to engage with the disc.

It will be noted that when the marker is attached by the exertion of slight pressure the disc will, as shown in Fig. 1, completely hide the strip and will itself alone be visible producing a more attractive and practical effect.

To ensure that the marker will not be taken off to be used again, we may provide weakened portions as at 20, in the sides of the body A, parallel with the tongues while to ensure strength without adding to the weight, these sides are reinforced by ribs 22, and the tongues themselves by ribs 23.

In operation, which will be apparent from the foregoing, the marker is grasped with the thumb and second finger of the right hand and slightly bent to a curve as indicated in Fig. 4, separating the serrated extremities 13 and 14, of the gripping members 11 and 12, so that when brought in contact with the breast of a bird the skin 22ᵃ is engaged and on further pressure being exerted to straighten out the curved strip, as shown in Fig. 5, the skin of the bird is automatically gripped to securely retain the marker in position. Simultaneously with the foregoing, the flexible indicia carrying means in the form of a disc or label 18, bend as shown in fig. 4, to co-operate with the metal portion of the marker and straighten out as shown in Fig. 5, to completely cover the metal portion or strip as disclosed in Fig. 1. It will also be noted that should it be necessary, in order to conform to the contour of the object being marked or graded, to further bend the strip from a substantially flat position, as shown in Fig. 5, the gripping tongues 11 and 12, will continue to securely retain the marker in position. Furthermore, to prevent tampering with or removal of the mark for fraudulent or other use again, a plurality of weakened portions 20, associated with the gripping tongues are provided and ensure that on any attempt being made to bend back the strip to the position illustrated in Fig. 4, it would break at one or more of the weakened parts.

It will be easily understood that the simple, light and durable construction involved ensure much quicker operation in grading poultry, birds and the like in large numbers than could possibly be attained by anything of this kind heretofore in use, while the feature of automatically becoming attached by gripping the object to be graded or marked, on being placed with a little pressure thereon, is a step ahead in theory and practice involving practically no labour as compared with devices of this character heretofore in use in which it was necessary to clamp on or twist them around some portion of a bird and which even then were by no means practical, effective or attractive.

In Figures 8 to 14 inclusive, are illustrated modified forms of the marker in which the disc 18, is secured to or forms part of one end of the flexible metallic strip while means for attaching the strip are associated therewith, such as a rivet 30, in Figures 8 and 10, a bendable end portion 31, with a pointed extremity 32, to engage with an opening 33, as shown in Figure 9, a bendable end 34, and a cut out tongue 35, co-operating therewith as shown in Figures 11 and 12, and provided with a piercing prong 36, for engagement with an opening 37, while in Figures 13 and 14, the indicia is carried on the strip and a piercing member 38, is also provided.

Various forms of the apparatus described will suggest themselves to those skilled in the art; it is, therefore, not intended that the present application should be limited to any particular form of construction; modifications may be made in the apparatus above described within the scope of the claims, without departing from the spirit or scope thereof and including the use of an adhesive on the indicia carrying means when the latter takes the form of a label.

What we claim for our invention is:

1. A grade indicating tag for poultry, birds, food products, merchandise and the like, comprising a flexible metallic strip intermediately formed with gripping members operable to open and gripping position by bending the strip and flexible indicia carrying means associated with the strip.

2. A tag for poultry, birds, animals, food products and the like, comprising a flexible metallic strip formed with gripping tongues operable to open or gripping position by bending the strip, flexible indicia carrying means associated with the strip.

3. Grade indicating means for dressed poultry, birds and food products generally, comprising a flexible metallic strip stamped to form tongues with gripping tips or extremities operable to automatically open to engaging position and to close to gripping position by bending the strip and flexible indicia carrying means such as a disc or label suitably secured on the strip.

4. An indicating tag comprising a flexible metallic strip formed with gripping tongues operable by bending the strip to open or closed position, a disc, label or the like of flexible material for indicia, carried by the strip and operable therewith to completely conceal the strip in attached position.

5. An indicating tag comprising a flexible metallic strip formed with gripping tongues operable by bending the strip to open or closed position, a disc or label of flexible material for indicia, carried by the strip and bendable therewith to completely conceal the strip in attached position, and means associated with the strip for securely retaining the indicia carrying disc or label thereon.

6. An indicating tag comprising a flexible metallic strip intermediately formed with gripping members, an indicia carrying disc or label carried by the strip and retaining means associated with the label and co-operating with the gripping members to retain the disc or label on the strip.

7. A grade indicating device for poultry, birds and food products generally, comprising a flexible metallic strip adapted to be handled from both ends and intermediately stamped to provide gripping tongues, an indicating disc or label of flexible material co-operating with the strip whereby on the strip being bent the tongues are opened to contact with the object to be marked and on the strip being straightened out the tongues grip the object to securely retain the disc protruding thereon while hiding the strip.

8. In an indicating tag the combination with flexible indicia carrying means, of a metallic strip formed with co-operating gripping tongues designed on the strip being bent to open and on the strip being straightened out and further bent to automatically and securely attach the tag to the object to be marked while exposing only the indicia thereon.

9. The combination with an indicia carrying disc, label, button or the like of suitable material, of a flexible metallic strip intermediately formed with gripping tongues operable to engaging and gripping position by bending the strip, and weakened portions in the strip co-operating with the tongues to cause the strip to break on being detached.

10. In a marking tag a metallic strip with indicia carrying means, and means formed in the strip automatically operable by bending the strip for engaging with and securely attaching the tag to an object to be marked and exposing only the indicia carrying means.

11. A tamper-proof marking tag comprising a flexible metallic strip, indicia carrying means for the strip and attaching means formed in the strip and automatically operable to open or attaching position on bending the strip, and weakened portions in the strip co-ordinating with the attaching means.

JOHN ORMOND KER.
WARD ASHTON.